(No Model.)
G. A. STANTON.
GAFF HOOK.
No. 503,176. Patented Aug. 15, 1893.
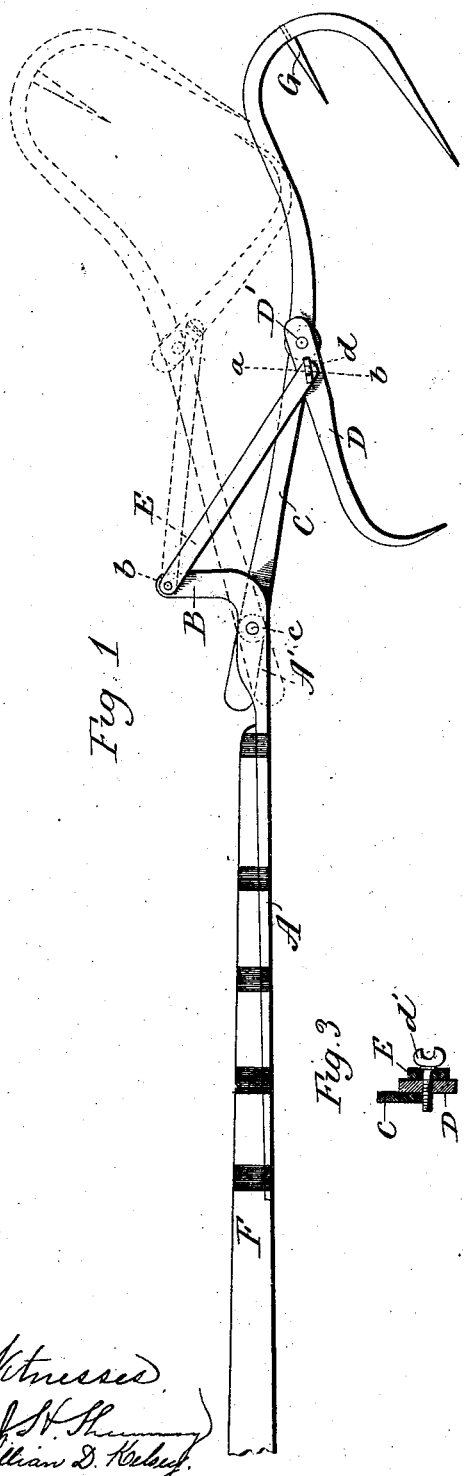
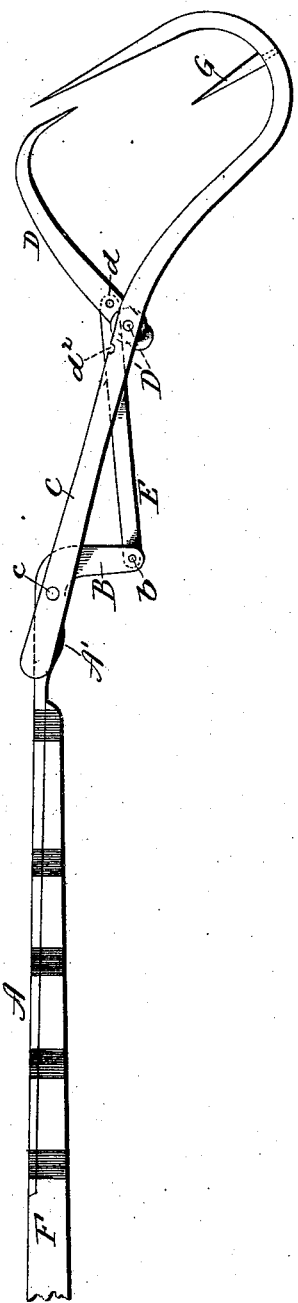

UNITED STATES PATENT OFFICE.

GILBERT A. STANTON, OF LONG LAKE, NEW YORK, ASSIGNOR OF ONE-FOURTH TO GEORGE E. TERRY, OF WATERBURY, CONNECTICUT.

GAFF-HOOK.

SPECIFICATION forming part of Letters Patent No. 503,176, dated August 15, 1893.

Application filed November 28, 1892. Serial No. 453,364. (No model.)

*To all whom it may concern:*

Be it known that I, GILBERT A. STANTON, of Long Lake, in the county of Hamilton and State of New York, have invented a new Improvement in Gaff-Hooks; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a gaff-hook constructed in accordance with my invention, its operating parts being shown by full lines in position for their initial operation by broken lines after the secondary hook has made its stroke; Fig. 2, a similar view showing the device reversed in position as for hauling in a fish, the weight and pull of which cause it to turn in the hand, and the secondary hook to be struck farther into the fish; Fig. 3, an enlarged sectional view on the line $a—b$ of Fig. 1, showing how the secondary hook is stopped in its extreme open position.

My invention relates to an improvement in gaff-hooks, the object being to produce a simple and durable device of superior convenience, reliability in use, and safety in handling, by employing the principle of leverage to operate the secondary hook, in place of the spring heretofore used for the purpose, and by my invention dispensed with.

With these ends in view, my invention consists in a gaff-hook provided with a frame-piece having a shank and an arm located at the outer end thereof, and extending at an angle to it, a long-shanked primary hook, pivoted to the outer end of the shank of the said frame-piece, and turning in the opposite direction from the arm thereof, a secondary or striking hook pivoted to the primary hook in opposition to the curved and pointed end of the same, and a link connecting the outer end of the said arm of the frame-piece with the secondary hook, and thereto extending diagonally across the shank of the primary hook.

My invention further consists in certain details of construction and combinations of parts as will be hereinafter described and particularly recited in the claims.

My improved device consists essentially, of a frame-piece having a shank A, and an arm B, a primary hook C, a secondary or striking hook D, and link E. The shank A, of the frame-piece is adapted to be bound to the end of the pole or rod F, which is of ordinary form, and its outer end is turned at a right angle to its main portion, as at A'. As shown, the arm B of the said frame-piece stands at a right angle to the shank thereof. The primary hook C, has a long shank, the inner end of which is pivotally secured by a pivot $c$, to the portion A' of the shank, the outer end of the said hook being turned in the opposite direction from the arm B, of the frame-piece. The said hook is provided in the center of its bent outer end, with a prong G, of ordinary construction. The secondary hook D, is secured by a pivot D', to the shank of the primary hook, and arranged in opposition to the curved and pointed end of the same, so that its point and the point thereof will co-operate in seizing the fish. The link E, connects the secondary hook D, with the outer end of the arm B, and thereto extends diagonally across the rear end of the shank of the primary hook. The said lever is connected to the said arm by a pin $b$, and to the said hook by a small thumb-screw $d'$, the projecting shank of which strikes into a notch $d^2$ formed in the edge of the shank of the primary hook, for stopping the secondary hook in its extreme open position, in which it is shown by Fig. 1 of the drawings.

In using my improved hook, it is opened, as shown by full lines in Fig. 1 of the drawings, and then passed down over the fish, so that the same is included between the pointed ends of its primary and secondary hook. By a quick movement the shank of the primary hook is then struck against the fish, causing the said hook to be thrown back into the position in which it is shown in broken lines by Fig. 1 of the drawings. This movement of the hook brings the link E into play, for striking the secondary hook forward, as also shown by broken lines in said figure, whereby the two hooks seize the fish, the weight and resistance of which tend to reverse the device, which the fisherman either allows by relaxing his grip on the pole or rod F, or effects by a movement of his wrist, the device then taking, or being brought into, the position in which it is shown by Fig. 2 of the drawings. The primary hook will now be turned further on its pivot under the weight and pull of the fish, and the secondary hook struck farther into the fish, which may now be landed safely, for the more resistance it offers, the more will the secondary hook be struck inward.

It will thus be seen that in a gaff-hook constructed in accordance with my invention, the secondary hook is operated by employing the principle of leverage, and without the use of a spring, to obvious advantage, as springs necessitate complication, are not reliable, and made gaff-hooks somewhat unsafe to handle.

I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a gaff-hook, the combination with a frame-piece having a shank and an arm located at the outer end thereof, and extending at an angle to it, a long-shanked primary hook, pivoted to the outer end of the said frame-piece, and turning in the opposite direction from the arm thereof, a secondary or striking hook pivoted to the primary hook in opposition to the curved and pointed end of the same, and a link connecting the outer end of the said arm with the secondary hook, and thereto extending diagonally across the rear end of the shank of the primary hook, substantially as described.

2. In a gaff-hook, the combination with a frame-piece having a shank and an arm located at the outer end thereof, and extending at an angle to it, a long-shanked primary hook, pivoted to the outer end of the said frame-piece, and turning in the opposite direction from the arm thereof, a secondary or striking-hook pivoted to the primary hook in opposition to the curved and pointed end of the same, a link connecting the outer end of the said arm with the secondary hook, and thereto extending diagonally across the rear end of the shank of the primary hook, and a stop for limiting the opening of the secondary hook, substantially as described.

In testimony whereof I have signed this specification in the presence of two subscribing witnesses.

GILBERT A. STANTON.

Witnesses:
 ROBERT SHAW,
 W. D. JENNINGS.